(12) United States Patent
Nakahama

(10) Patent No.: US 10,474,122 B2
(45) Date of Patent: Nov. 12, 2019

(54) MACHINING TOOL WITH NUMERICAL CONTROL DEVICE

(71) Applicant: FANUC Corporation, Yamanashi (JP)

(72) Inventor: Yasuhiro Nakahama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/818,669

(22) Filed: Aug. 5, 2015

(65) Prior Publication Data

US 2016/0041546 A1 Feb. 11, 2016

(30) Foreign Application Priority Data

Aug. 6, 2014 (JP) ................................ 2014-160168

(51) Int. Cl.
| | |
|---|---|
| *G06F 19/00* | (2018.01) |
| *G06K 7/00* | (2006.01) |
| *H05K 3/30* | (2006.01) |
| *G05B 19/19* | (2006.01) |
| *G05B 19/402* | (2006.01) |

(52) U.S. Cl.
CPC ........... *G05B 19/19* (2013.01); *G05B 19/402* (2013.01); *G05B 2219/41114* (2013.01)

(58) Field of Classification Search
CPC ..... B60G 17/018; G05B 19/232; G05B 19/19
USPC .......................................... 29/833; 700/245
See application file for complete search history.

(56) References Cited

U.S. PATENT DOCUMENTS

| | | | | | |
|---|---|---|---|---|---|
| 4,888,536 | A | * | 12/1989 | Sakai | ................... G05B 19/232 318/590 |
| 2002/0043293 | A1 | * | 4/2002 | Knighten | .................. B27F 5/12 144/2.1 |
| 2005/0060883 | A1 | * | 3/2005 | Sakai | ................. H05K 13/0413 29/833 |
| 2005/0067529 | A1 | * | 3/2005 | Takadama | ................ B64G 9/00 244/118.1 |
| 2006/0232025 | A1 | | 10/2006 | Braud | |
| 2008/0096746 | A1 | * | 4/2008 | Ryuhan | .................. B23Q 1/012 483/30 |

(Continued)

FOREIGN PATENT DOCUMENTS

| | | |
|---|---|---|
| CN | 101195221 A | 6/2008 |
| CN | 102639291 A | 8/2012 |

(Continued)

OTHER PUBLICATIONS

Decision to Grant a Patent in JP Application No. 2014-160168, dated Jun. 21, 2016.

(Continued)

*Primary Examiner* — Bickey Dhakal
*Assistant Examiner* — Cortez Cook
(74) *Attorney, Agent, or Firm* — Hauptman Ham, LLP

(57) ABSTRACT

A machining tool with a numerical control device includes an actual gravity center calculation unit configured to calculate an actual gravity center, the actual gravity center being a whole gravity center of the machining tool and the load, a target gravity center position set unit, a movable part position correction unit configured to correct the relative position of the movable part to the fixed part, to make the target gravity center position and the whole center gravity center position of the machining tool and the load coincident.

9 Claims, 2 Drawing Sheets

(56) References Cited

U.S. PATENT DOCUMENTS

| | | | |
|---|---|---|---|
| 2008/0140257 A1 | 6/2008 | Sato et al. | |
| 2010/0305758 A1* | 12/2010 | Nishi | B23Q 17/00 |
| | | | 700/264 |
| 2011/0257787 A1* | 10/2011 | Sato | B25J 9/1633 |
| | | | 700/258 |
| 2012/0259463 A1* | 10/2012 | Orita | B25J 9/1648 |
| | | | 700/245 |
| 2013/0030650 A1* | 1/2013 | Norris | B60G 17/018 |
| | | | 701/40 |
| 2013/0338832 A1* | 12/2013 | Sato | B25J 9/1633 |
| | | | 700/260 |
| 2015/0177090 A1 | 6/2015 | Nakahama | |

FOREIGN PATENT DOCUMENTS

| | | |
|---|---|---|
| EP | 2508297 A1 | 10/2012 |
| JP | 1-193134 A | 8/1989 |
| JP | 5-116081 A | 5/1993 |
| JP | 2005-131715 A | 5/2005 |
| JP | 2010-23941 A | 2/2010 |
| JP | 2010-211467 A | 9/2010 |
| JP | 2015-121867 A | 7/2015 |

OTHER PUBLICATIONS

Office Action in CN Application No. 201510477384.0, dated Jun. 1, 2017.

Examination Search Report in DE Application No. 102015112888.8, dated Apr. 30, 2019, 8pp.

* cited by examiner

MACHINING TOOL WITH NUMERICAL CONTROL DEVICE

RELATED APPLICATIONS

The present application claims priority to Japanese Application Number 2014-160168, filed Aug. 6, 2014, the disclosure of which is hereby incorporated by reference herein in its entirety.

BACKGROUND OF THE INVENTION

1. Field of the Invention

The present invention relates to a machining tool with a numerical control device, and particularly relates to a machining tool with a numerical control device having adjustment function of gravity center of a main body of the machining tool.

2. Description of the Related Art

A relatively small and lightweight machining tool is often moved a short distance. Moving method includes, hoisting the machining tool with a crane or the like, and lifting the machining tool by a dolly or a lift such as a forklift or a manual forklift. Since a lift itself is compact, the lift is used for relatively short distance relocation, such as relocation in a factory building.

When a lift raises a machining tool, fork position and fork width need to be determined such that a gravity center of the machining tool is located between the two forks of the lift. It is important to grasp the gravity center position of the machining tool to determine the fork position and the fork width.

Japanese Patent Laid-Open No. 2005-131715 discloses a technique in which a transport auxiliary device for an industrial robot uses a forklift. In the industrial robot, engaging holes are formed and exclusive parts are attached to a base portion, such that a gravity center of the whole robot comes between the two forks of the forklift. The forklift inserts the forks to a receiving portion to lift the robot in a stable conveying attitude.

A small machining tool may also be relocated by a lift. For many small machining tools, lift insertion points are not fixed. When a moving part position and a weight of a load mounted on the moving part such as a top face of a table change in every replacement, the gravity center position also changes, so the lift insertion points need to be decided according to the gravity center position.

There are two methods of relocation of a small machining tool by a lift. One method is to raise the machining tool after the lift is positioned according to the gravity center position of the machining tool. The other method is to position the moving part such that the gravity center position comes between the forks after the position of the lift is determined preliminarily.

In the latter method of positioning the moving part after the position of the lift is determined preliminarily, a position of the moving part for stable lifting is determined in the end, after such operations are repeatedly tried that, moving part position where a gravity center position comes between the forks is predicted and assumed first, then the machining tool is lifted, and a moving part position is corrected according to the balance of the lifted machining tool. When the first assumed gravity center position is markedly different from the true gravity center position, trial times increases causing man-hours increase. In addition, there is a possibility that repetition of lifting up and lifting down causes a load on machine parts. Therefore, it is desirable to grasp precisely from the first, a movable part position where the gravity center comes between the forks, so as to reduce number of trials.

In addition to that, lifting operation by a forklift is performed while an electrical source of a machine is deactivated in many cases. In these cases, such a way is adopted that, a movable part position is moved directly by hand forcibly to correct a movable part position, since positioning by a numerical control device is impossible. This way can not be adopted for a machine with a configuration in that the brake is applied to a moving shaft while an electrical power is deactivated.

Considering these things above mentioned, such a machine is desirable that, a moving part is precisely positioned while an electrical power of the machine is activated, for correction of the position of the moving part.

SUMMARY OF THE INVENTION

Therefore, the object of the invention is to provide a machining tool with a numerical control device, capable of adjusting a gravity center position of the machining tool to an arbitrary point in a simple way.

A machining tool with a numerical control device according to the invention includes a numerical control device, a machining tool to be controlled by the numerical control device, the machining tool having a fixed part, and a movable part on which a load is configured to be loaded. The numerical control device includes a storage unit configured to store weight and gravity center position of each the fixed part, movable part, and the load, an actual gravity center calculation unit configured to calculate an actual gravity center, the actual gravity center being a whole gravity center of the machining tool and the load, based on the gravity center position and the weight of the fixed part stored in the storage unit, the gravity center position and the weight of the movable part stored in the storage unit, a relative position of the movable part to the fixed part, and the gravity center position and the weight of the load stored in the storage unit, a target gravity center position set unit configured to set a target gravity center position, the target gravity center position being the whole gravity center position of the machining tool and the load, a movable part position correction unit configured to correct the relative position of the movable part to the fixed part, to make the target gravity center position set by the target gravity center position set unit and the whole center gravity center position of the machining tool and the load coincident.

The machining tool includes a target gravity center position set unit configured to set a target gravity center position for the whole gravity center position of the machining tool and the load, and a movable part position correction unit configured to correct the relative position of the movable part to the fixed part, to make the target gravity center position and the whole center gravity center position coincident. Therefore, the machining tool is capable of adjust the gravity center position of the machining tool to an arbitrary point.

A machining tool with a numerical control device according to the present invention includes a movable part position correction unit configured to correct a relative position of the movable part to a fixed part, to make the target gravity center position and the whole center gravity center position coincident, after the target gravity center position, which is whole gravity center position of the machining tool and the load, is set. With the movable part position correction unit, the machining tool is able to adjust gravity center position of the machining tool to arbitrary position, and even when lift position is arbitrary set for relocation by a forklift or the like, subsequent gravity center point change by movable part position adjustment enables operation with a stable attitude.

By configuring the present invention as described above, a machining tool with a numerical control device, capable of adjusting a gravity center position of the machining tool to an arbitrary point in a simple way, can be provided.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
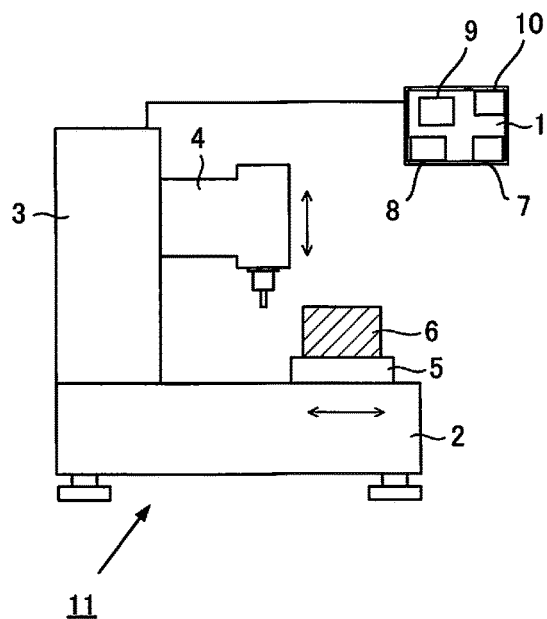
FIG. 1 is a schematic view of a machining tool with a numerical control device according to an embodiment of the present invention.

FIG. 1 shows a schematic view of a machining tool with a numerical control device in an embodiment of the present invention. Numeral "1" denotes a numerical control device, including CPU 7 and a storage 8 inside thereof, and a display unit 9 and an input unit 10 on its surface. The numerical control device is connected to a machining tool 11. The machining tool 11 comprises, a base 2, a column 3, a spindle head 4, a table 5, etc. Numeral "6" denotes a load such as a workpiece on a top face of the table or a jig. The base 2 and the column 3, which remain stationary with respect to a ground plane, correspond to a fixed part. The spindle head 4 and the table 5, which are relatively movable to a fixed part including the base 2 and the column 3 with a control command issued by a numerical control device 1, correspond to a movable part.

In advance, gravity center position and weight of the fixed part, and a gravity center position and a weight of the movable part, are stored in the storage 8 installed in the numerical control device 1. The fixed part includes the base 2, the column 3, and the like, while the movable part includes the spindle head 4, the table 5, and the like. CPU 7 calculates whole gravity center position of the machining tool 11 and the load 6, based on relative position of the movable part including the spindle head 4, the table 5, and the like, to the fixed part, and based on information concerning the gravity center position and the weight of the load 6 mounted on the table 5 acquired by a predetermined method. Specific method of the calculation will be described later.

The display unit 9 displays whole gravity center position of the machining tool 11 and the load 6, calculated by CPU 7. Information on a component of at least one direction may be displayed when the gravity center position is displayed.

Information on the gravity center position is input by an operator using an input unit 10. Relation of, the weight and the gravity center position of the load 6 to be mounted on the table 5 and parameters in acceleration and deceleration of the table 5, may be set in the storage 8 in the numerical control device 1. In this case, the gravity center position and the weight of the load 6 mounted on the table 5 may be estimated to use them, from values of parameters in acceleration or deceleration, by moving the table 5 on which the load 6 is mounted. The input unit may also be used to specify a target gravity center position as described later.

Figure 2:
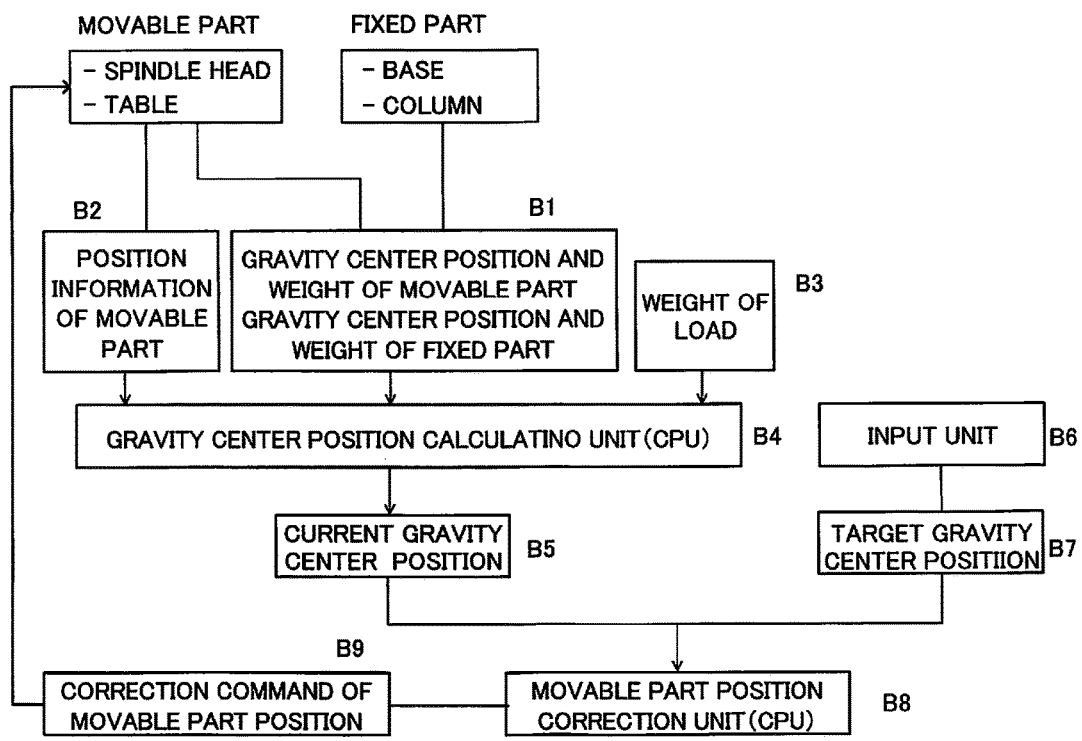
FIG. 2 is a block diagram illustrating calculation method of whole gravity center position of a machining tool and a load according to an embodiment of the present invention.

FIG. 2 is a block diagram illustrating calculation method of the whole gravity center position of the machining tool 11 and the load according 6, using information on the gravity center position and the weight of the load 6. Hereinafter, each step will be explained.

First of all, components of the machining tool 11 are distinguished between a fixed part and a movable part. The fixed part remains stationary with respect to a ground plane, while the movable part is relatively movable to the fixed part. In the present embodiment, the fixed part includes the bed 2 and the column 3, and the movable part includes the spindle head 4 and the table 5. First, in block B1, values of the gravity center position and the weight of the movable part, and values of the gravity center position and the weight of the fixed part, are obtained. In block B2, position information of the movable part is obtained. In block B3, the weight of the load 6 is obtained. The weight of the load 6 may be obtained in such a way that, an operator input the weight by the input unit 10, or the weight is estimated from a value of parameters in acceleration or deceleration by moving the table 5 on which the load 6 is mounted.

In block B4, the whole gravity center position of the machining tool 11 and the load 6 is calculated by CPU 7, based on the position information of the movable part, the gravity center position and the weight of the movable part, the gravity center position and the weight of the fixed part, the weight of the load. Then the calculated whole gravity center position values are stored in the storage 8 in block B5. At this time, the calculated whole gravity center position values may be displayed by the display unit 9.

In block B6, the target gravity center position is specified using the input unit 10. The specified target gravity center position is stored in the storage 8 in block B7. At this time, the specified target gravity center position values may be displayed by the display unit 9.

In block B8, movable part correction amount is calculated based on the current gravity center position and the target gravity center position stored in the storage 8. Movable part position correction command is issued based on the calculated movable part correction amount, and the movable part position is corrected, in block B9. Specific methods of the calculation of the gravity center position and the movable position correction amount will be described later.

Next, specified calculation method of the gravity center will be explained.

Whole gravity center position of the machining tool 11 and the load 6 is calculated using the following equation.

$$\vec{r} = \frac{M_S \vec{r}_S + M_H \vec{r}_H + M_T \vec{r}_T + M_L \vec{r}_L}{M} \quad (1)$$

$$M = M_S + M_H + M_T + M_L \quad (2)$$

$\vec{r}$: Whole gravity center position vector of the machining tool and the load $\vec{r}_S$: Gravity center position vector of the fixed part, including the base and the column $\vec{r}_H$: Gravity center position vector of the spindle head $\vec{r}_T$: Gravity center position vector of the table $\vec{r}_L$: Gravity center position vector of the load mounted on the table M: Total mass of the fixed part and the movable part $M_S$: Total mass of the fixed part, including the base and the column $M_H$: Mass of the spindle head $M_T$: Mass of the table $M_L$: Mass of the load mounted on the table Here, components which has no need to be considered for calculation of the gravity center position, can be neglected in the calculation process.

Figure 3:
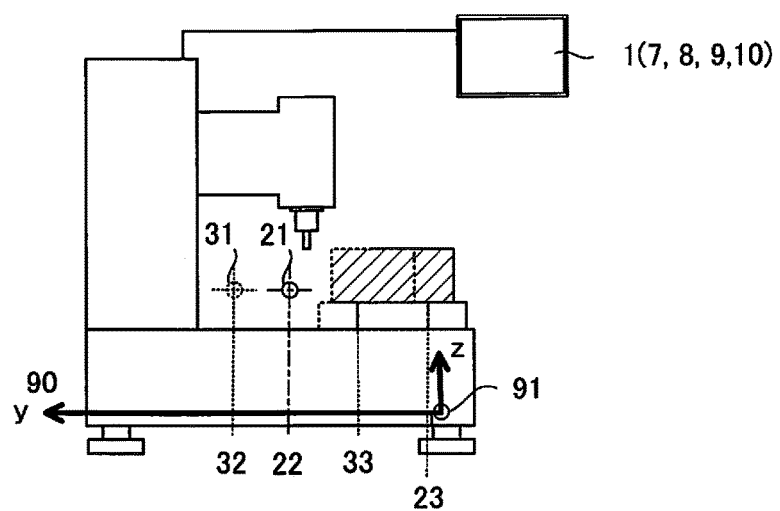
FIG. 3 is a view showing movement of a movable part in a machining tool with a numerical control device according to an embodiment of the present invention.

As an example, a reference coordinate system 90 is used, in which horizontal direction and vertical direction are set as a basis, and the horizontal direction coincides with a direction of the side face (y direction) at the time when the machining tool is set, and the vertical direction coincides with z direction, as shown in FIG. 3. In addition, a reference position mark 91 as a reference of position is provided on the fixed part, and the origin of coordinates of the reference coordinate system 90 is made coincide with the reference position mark 91.

Thus, information on the gravity center position is expressed as a vector amount expressed in equation (1), with the reference position mark 91 as the origin of the coordinates.

An example is considered, where a lift is inserted in x direction to the reference coordinate 90, in the following.

Here, only y direction component needs to be considered for considering the gravity center position, so only y direction component is considered in equation (1). The component is calculated by the following equation.

$$r_y = \frac{M_S r_{Sy} + M_H r_{Hy} + M_T r_{Ty} + M_L r_{Ly}}{M} \quad (3)$$

In a case where y direction component of the gravity center position of the table 5 coincides approximately with y direction component of the gravity center position of the load 6, the equation (3) is approximated as the following equation, omitting information on the gravity center position of the load 6.

$$r_y = \frac{M_S r_{Sy} + M_H r_{Hy} + (M_T + M_L) r_{Ty}}{M} \quad (4)$$

Specified calculation method of the movable part position correction will follow.

When arbitrary gravity center position as a target is given by the input unit 10, the following equation is obtained from the equation (1).

$$\vec{\gamma} = \frac{M_S \vec{r}_S + M_H \vec{\gamma}_H + M_T \vec{\gamma}_T + M_L \vec{\gamma}_L}{M} \quad (5)$$

$\vec{\gamma}$: position vector of target gravity center position of the whole of the fixed part and the movable part $\vec{\gamma}_H$: gravity center position vector of the spindle head in a case of $\vec{r} = \vec{\gamma}$ $\vec{\gamma}_T$: gravity center position vector of the table in a case of $\vec{r} = \vec{\gamma}$ $\vec{\gamma}_L$: gravity center position vector of the load mounted on the table in a case of $\vec{r} = \vec{\gamma}$ Considering the y direction component of the equation (5), since the spindle head 4 can move only in z direction in the machining tool with a configuration shown in FIG. 1, $\gamma_{Hy}$ is equal to $r_{Hy}$. When $\gamma_{Ty}$ is regarded to be equal to $r_{Ly}$, the following equation is obtained from the equation (4).

$$\gamma_y = \frac{M_S r_{Sy} + M_H r_{Hy} + (M_T + M_L) \gamma_{Ty}}{M} \quad (6)$$

The following equation is obtained from the equations (4) and (6).

$$\gamma_{Ty} = r_{Ty} + \frac{M}{M_T + M_L}(\gamma_y - r_y) \quad (7)$$

Gravity center position of the whole machine coincides with the target position $\gamma_y$, when y direction component of the table is made to be $\gamma_{Ty}$ calculated from equation (7).

The details will be explained using FIG. 3. The position of the table and the load 6 is shown with solid line, and numeral "23" denotes the current position of the movable part. Numeral "21" denotes the gravity center position of the whole machining tool of the fixed part and the movable part, and numeral "22" denotes y direction component of gravity center position 21 of the whole machining tool.

When a target gravity center position 31 as the target position is specified by the input unit 10 or the like, the movable part position correction unit calculates a position of the movable part 33 where the gravity center position of the whole machining tool coincides with the target gravity center position 31, and the movable part is moved so that the movable part position coincides with the above mentioned position of the movable part 33. Here, numeral "32" denotes y direction component of the target gravity center position 31.

In general, movable range of the movable part of the machine is restricted physically or by a software program, hence such a configuration may be adopted that warning is given by alarming or the like in a case where the value obtained in the equation (7) exceeds the range.

The invention claimed is:

1. A machining tool, comprising:
    a numerical control device configured to control operation of the machining tool,
    a fixed part, and
    a movable part which is movable relative to the fixed part and on which a load is to be loaded, the numerical control device comprising:
    a storage unit configured to store a weight and a gravity center position of each of the fixed part, the movable part, and the load;
    an actual gravity center calculation unit configured to, when a weight of the load changes each time, calculate an actual gravity center, the actual gravity center being a whole gravity center of the machining tool and the load, based on
        the gravity center position and the weight of the fixed part stored in the storage unit,
        the gravity center position and the weight of the movable part stored in the storage unit, a relative position of the movable part to the fixed part, and the gravity center position and the weight of the load stored in the storage unit;

a target gravity center position set unit configured to set an arbitrary point based on data through an input unit as a target gravity center position for the whole gravity center of the machining tool and the load; and a movable part position correction unit configured to cause the movable part to move relative to the fixed part to the arbitrary point to make a position of the whole center gravity center of the machining tool and the load coincide with the target gravity center position set by the target gravity center position set unit.

2. The machining tool according to claim 1, wherein the movable part is configured to move in response to activation of an electrical power of the machining tool.

3. The machining tool according to claim 1, wherein the storage unit is configured to store the target gravity center position.

4. The machining tool according to claim 1, further comprising a display configured to display the target gravity center position.

5. The machining tool according to claim 1, wherein the fixed part includes a base and a column, the movable part includes a spindle head and a table,
the spindle is movable relative to the column, and
the table is movable relative to the base.

6. The machining tool according to claim 1, further comprising a device configured to issue a warning in response to the movable part moving beyond a movable range of the movable part.

7. The machining tool according to claim 1, wherein the numerical control device further includes the input unit configured to receive the data of the arbitrary point input by an operator.

8. The machining tool according to claim 1, wherein the movable part position correction unit is further configured to calculate a moveable part correction amount based on the whole gravity center of the machining tool and the load and the target gravity center position, and issue a command based on the calculated movable part correction amount to correct a position of the movable part.

9. The machining tool according to claim 1, wherein the numerical control device is configured to estimate the gravity center position and the weight of the load based on values of parameters in acceleration or deceleration of the moveable part.

* * * * *